(12) United States Patent
Haas et al.

(10) Patent No.: US 9,020,667 B2
(45) Date of Patent: Apr. 28, 2015

(54) EMPTY-LOAD DEVICE FEEDBACK ARRANGEMENT

(75) Inventors: Carl L. Haas, Walkersville, MD (US); Edward W. Gaughan, Greensburg, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 290 days.

(21) Appl. No.: 13/493,238

(22) Filed: Jun. 11, 2012

(65) Prior Publication Data

US 2013/0332012 A1    Dec. 12, 2013

(51) Int. Cl.

| G05D 1/00 | (2006.01) |
|---|---|
| G05D 3/00 | (2006.01) |
| G06F 7/00 | (2006.01) |
| G06F 17/00 | (2006.01) |
| B61H 13/30 | (2006.01) |
| G06F 11/30 | (2006.01) |

(52) U.S. Cl.
CPC ............... *B61H 13/30* (2013.01); *G06F 11/30* (2013.01)

(58) Field of Classification Search
CPC ..... B60T 8/1893; B60T 8/185; B60T 8/3235; B60T 17/12; B60T 8/1705; B60T 8/1837
USPC ........................ 303/127, 128, 132; 701/19, 20
See application file for complete search history.

(56) References Cited

U.S. PATENT DOCUMENTS

| 2,993,199 | A | | 7/1961 | Browne et al. | |
|---|---|---|---|---|---|
| 3,612,230 | A | * | 10/1971 | Ludington et al. | 188/195 |
| 3,794,146 | A | * | 2/1974 | Ludington et al. | 188/195 |
| 3,910,639 | A | * | 10/1975 | Engle | 303/3 |
| 3,924,902 | A | * | 12/1975 | Engle | 303/132 |
| 3,957,314 | A | | 5/1976 | Falke | |
| 4,041,470 | A | | 8/1977 | Slane et al. | |
| 4,093,316 | A | * | 6/1978 | Reinecke | 303/198 |
| 4,423,909 | A | * | 1/1984 | Page et al. | 303/22.2 |
| 4,487,060 | A | | 12/1984 | Pomeroy | |
| 4,498,712 | A | * | 2/1985 | Hart | 303/22.2 |
| 4,553,723 | A | | 11/1985 | Nichols et al. | |
| 4,648,661 | A | * | 3/1987 | Schmitt et al. | 303/22.2 |
| 4,786,117 | A | * | 11/1988 | Hart | 303/22.6 |
| 4,817,019 | A | | 3/1989 | Morihara | |
| 4,824,179 | A | * | 4/1989 | Rees | 303/22.7 |
| 4,826,259 | A | * | 5/1989 | Biegel | 303/22.2 |
| 5,201,834 | A | | 4/1993 | Grazioli et al. | |
| 5,267,473 | A | | 12/1993 | Bezos et al. | |

(Continued)

FOREIGN PATENT DOCUMENTS

| JP | 5957053 A | 4/1984 |
|---|---|---|
| JP | 402141354 A | 5/1990 |

(Continued)

*Primary Examiner* — Nicholas Kiswanto
(74) *Attorney, Agent, or Firm* — The Webb Law Firm (57) ABSTRACT

An empty-load device feedback arrangement for a train with the railcar having an air brake arrangement with an one air-operable braking assembly, the arrangement including: an empty-load device having: at least one sensor arrangement to sense a load associated with the railcar; a braking assembly input exhibiting a delivered air pressure; a regulation arrangement to regulate air pressure; and a braking assembly output exhibiting a regulated air pressure; and a pressure sensor to: sense the regulated air pressure of the air being delivered to the air-operable braking assembly; and generate a regulated air pressure signal. An air brake arrangement is also disclosed.

20 Claims, 4 Drawing Sheets

(56) References Cited

U.S. PATENT DOCUMENTS

| | | | |
|---|---|---|---|
| 5,303,987 A * | 4/1994 | McKay | 303/22.2 |
| 5,390,988 A | 2/1995 | Shank | |
| 5,394,137 A | 2/1995 | Orschek | |
| 5,445,347 A | 8/1995 | Ng | |
| 5,451,099 A | 9/1995 | Hart et al. | |
| 5,544,057 A | 8/1996 | Matsuoka | |
| 5,613,741 A | 3/1997 | Shank | |
| RE35,590 E | 8/1997 | Bezos et al. | |
| 5,654,889 A | 8/1997 | Wood et al. | |
| 5,662,391 A | 9/1997 | McKay | |
| 5,676,431 A | 10/1997 | McLaughlin et al. | |
| 5,681,015 A | 10/1997 | Kull | |
| 5,709,436 A | 1/1998 | Scott | |
| 5,738,311 A | 4/1998 | Fernandez | |
| 5,744,707 A | 4/1998 | Kull | |
| 5,746,485 A * | 5/1998 | Jamieson | 303/19 |
| 5,758,848 A | 6/1998 | Beule | |
| 5,808,909 A | 9/1998 | Rees | |
| 5,813,635 A | 9/1998 | Fernandez | |
| 5,817,934 A | 10/1998 | Skantar | |
| 5,862,048 A | 1/1999 | Knight | |
| 5,869,765 A | 2/1999 | Scott et al. | |
| 5,892,437 A | 4/1999 | Scheibe et al. | |
| 5,924,774 A | 7/1999 | Cook et al. | |
| 6,009,902 A * | 1/2000 | Troiani et al. | 137/614.19 |
| 6,024,419 A | 2/2000 | Waldrop et al. | |
| 6,094,977 A | 8/2000 | Vaughn | |
| 6,172,619 B1 | 1/2001 | Lumbis et al. | |
| 6,175,784 B1 | 1/2001 | Jicha et al. | |
| 6,189,980 B1 | 2/2001 | Kull | |
| 6,206,483 B1 | 3/2001 | LaLone | |
| 6,217,130 B1 * | 4/2001 | Engle | 303/22.2 |
| 6,269,682 B1 | 8/2001 | Vaughn | |
| 6,301,531 B1 | 10/2001 | Pierro et al. | |
| 6,302,495 B1 | 10/2001 | Peltz | |
| 6,305,756 B1 * | 10/2001 | Scott et al. | 303/22.2 |
| 6,322,025 B1 | 11/2001 | Colbert et al. | |
| 6,327,894 B2 | 12/2001 | Vaughn | |
| 6,352,315 B1 * | 3/2002 | Yin et al. | 303/22.2 |
| 6,400,281 B1 | 6/2002 | Darby, Jr. et al. | |
| 6,425,282 B2 | 7/2002 | Vaughn | |
| 6,457,782 B1 | 10/2002 | Truglio et al. | |
| 6,474,150 B1 | 11/2002 | Berg et al. | |
| 6,626,034 B2 | 9/2003 | Marra et al. | |
| 6,629,709 B1 | 10/2003 | Tunley et al. | |
| 6,648,424 B2 | 11/2003 | Vaughn | |
| 6,648,425 B2 | 11/2003 | Marra et al. | |
| 6,666,528 B1 * | 12/2003 | Gayfer et al. | 303/9.69 |
| 6,668,216 B2 | 12/2003 | Mays | |
| 6,669,308 B1 | 12/2003 | Aurich et al. | |
| 6,748,303 B2 | 6/2004 | Hawthorne | |
| 6,823,242 B1 | 11/2004 | Ralph | |
| 6,837,550 B2 | 1/2005 | Dougherty et al. | |
| 6,850,869 B2 | 2/2005 | Pierro et al. | |
| 6,867,708 B2 | 3/2005 | Darby, Jr. et al. | |
| 6,980,127 B2 | 12/2005 | Lumbis et al. | |
| 6,997,418 B1 | 2/2006 | Sanzone | |
| 7,038,597 B2 | 5/2006 | Smith | |
| 7,040,150 B2 | 5/2006 | Hawthorne et al. | |
| 7,054,777 B2 | 5/2006 | Crane et al. | |
| 7,073,753 B2 | 7/2006 | Root et al. | |
| 7,219,067 B1 | 5/2007 | McMullen et al. | |
| 7,373,224 B2 | 5/2008 | Goetz et al. | |
| 7,386,376 B2 | 6/2008 | Basir et al. | |
| 7,416,262 B2 | 8/2008 | Ring | |
| 7,627,546 B2 | 12/2009 | Moser et al. | |
| 7,664,459 B2 | 2/2010 | Smith, Jr. et al. | |
| 7,769,509 B2 | 8/2010 | Gaughan et al. | |
| 8,038,226 B2 * | 10/2011 | Knornschild et al. | 303/3 |
| 2001/0015575 A1 | 8/2001 | Truglio et al. | |
| 2002/0019688 A1 | 2/2002 | Mantini et al. | |
| 2002/0027495 A1 | 3/2002 | Darby, Jr. et al. | |
| 2002/0088673 A1 * | 7/2002 | Malac | 188/1.11 R |
| 2002/0116992 A1 | 8/2002 | Rickel | |
| 2002/0153765 A1 | 10/2002 | Levy et al. | |
| 2002/0188593 A1 | 12/2002 | Moser et al. | |
| 2003/0200020 A1 | 10/2003 | Ring | |
| 2004/0046442 A1 | 3/2004 | Aurich et al. | |
| 2004/0122566 A1 | 6/2004 | Horst et al. | |
| 2004/0192348 A1 | 9/2004 | Gudmundsson et al. | |
| 2005/0001471 A1 | 1/2005 | Hart | |
| 2005/0171696 A1 | 8/2005 | Naden et al. | |
| 2005/0205719 A1 | 9/2005 | Hendrickson et al. | |
| 2005/0283285 A1 | 12/2005 | Ying | |
| 2006/0047379 A1 | 3/2006 | Schullian et al. | |
| 2006/0074581 A1 | 4/2006 | Crane et al. | |
| 2006/0195327 A1 | 8/2006 | Kumar et al. | |
| 2006/0290199 A1 | 12/2006 | Beck et al. | |
| 2009/0069961 A1 | 3/2009 | Deepak et al. | |
| 2009/0206651 A1 | 8/2009 | Wright | |
| 2009/0218179 A1 | 9/2009 | Yokoyama et al. | |
| 2009/0306871 A1 | 12/2009 | Alford et al. | |
| 2010/0109426 A1 | 5/2010 | Fugiel et al. | |
| 2010/0295366 A1 | 11/2010 | Bradley et al. | |
| 2010/0327653 A1 | 12/2010 | Wygnanski et al. | |
| 2011/0029167 A1 | 2/2011 | Itano et al. | |
| 2011/0048875 A1 * | 3/2011 | Murtazin | 188/153 R |
| 2011/0270475 A1 | 11/2011 | Brand et al. | |

FOREIGN PATENT DOCUMENTS

| | | |
|---|---|---|
| JP | 6156233 A | 6/1994 |
| JP | 407315187 A | 12/1995 |
| JP | 200071964 A | 3/2000 |
| WO | 2005059503 A1 | 6/2005 |
| WO | 2006074028 A1 | 7/2006 |

* cited by examiner

EMPTY-LOAD DEVICE FEEDBACK ARRANGEMENT

BACKGROUND OF THE INVENTION

1. Field of the Invention

The present invention relates generally to brake monitoring systems and arrangements for use in connection with an air brake arrangement, and in particular to an empty-load device feedback arrangement and an air brake arrangement for a train, railcar, railway vehicle, and similar vehicles, and preferably an electronically-controlled pneumatic air brake arrangement for a railway vehicle.

2. Description of the Related Art

As is known in the art, braking systems and arrangements are required for slowing and stopping vehicles, such as cars, trucks, trains, railcars, railway vehicles, and the like. With specific respect to trains and other railway vehicles, the braking system is normally in the form of a pneumatically-driven arrangement (or "air brake arrangement") having mechanisms and components that interact with each railcar. A known air brake arrangement BA is illustrated in schematic form in FIG. 1.

Figure 1:
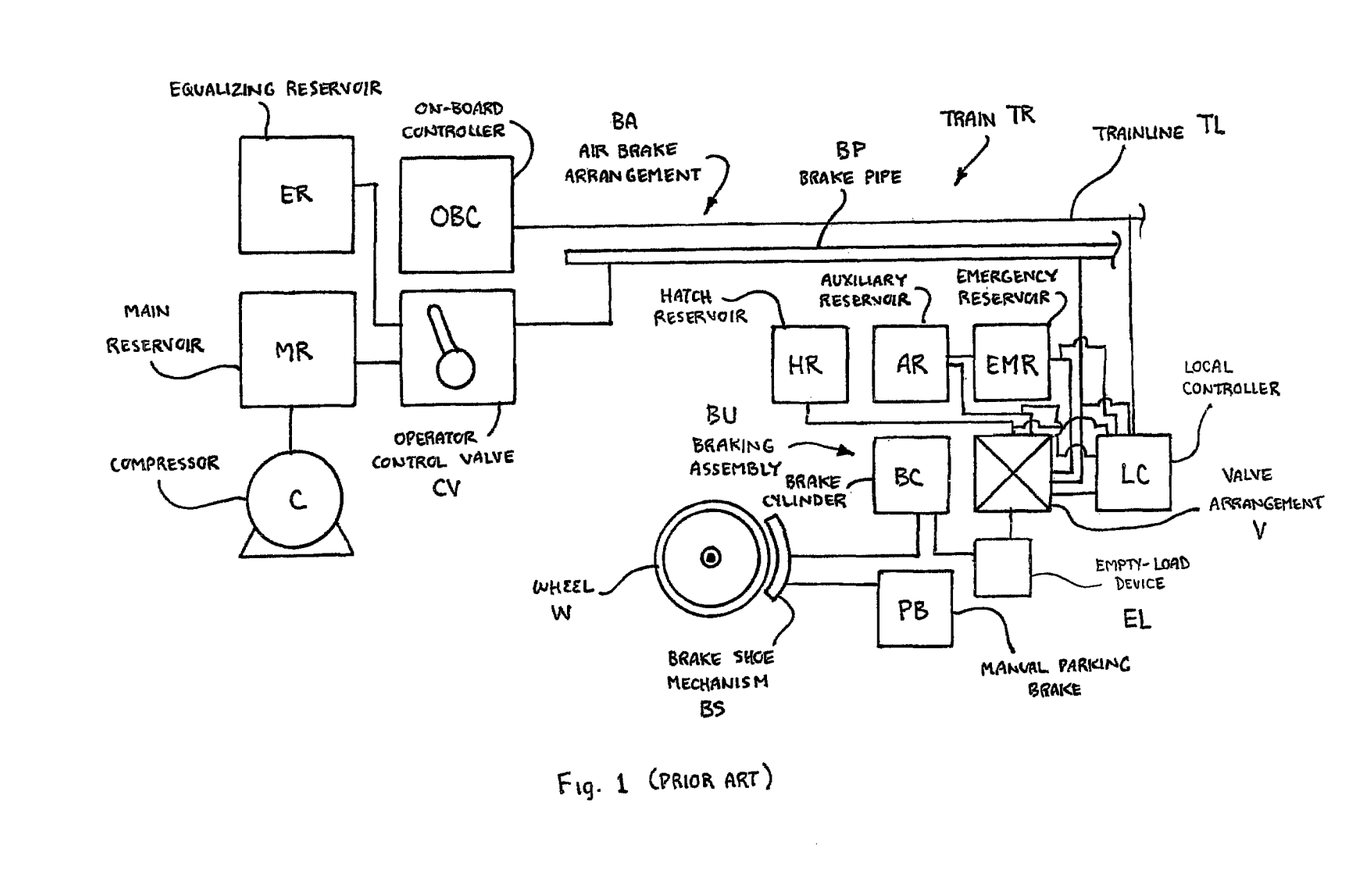
FIG. 1 is a schematic view of an air brake arrangement for a train according to the prior art.

With reference to FIG. 1, the operator of a train TR also has control over the braking arrangement BA through the use of an operator control valve CV. Through the movement of a handle associated with the control valve CV, the operator can adjust the amount of braking to be applied in the air brake arrangement BA. The higher the braking force selected, the faster the braking arrangement BA will attempt to slow and stop the train TR. Alternatively, and as discussed in more detail hereinafter, the air brake arrangement BA for each railcar may also be controlled by the operator from an on-board controller OBC that transmits data signals over a trainline TL (or cable extending between the locomotive and the railcars), which may be referred to as an electronically-controlled pneumatic (ECP) air brake arrangement. In addition, the on-board controller OBC may also be referred to as a head-end unit (HEU) when used in connection with an ECP-based braking system. Of course, the on-board controller OBC and head-end unit may be integrated as a single controller for use by the operator of the train TR.

In order to provide the appropriately compressed air to the system, and in certain conventional air brake applications, the air brake arrangement BA also includes a compressor C for providing compressed air to a main reservoir MR, which is in communication with the control valve CV. Further, an equalizing reservoir ER is also in communication with the control valve CV. Whether through the main reservoir MR or the equalizing reservoir ER, compressed air is supplied through the control valve CV to a brake pipe BP that extends along and is associated with each railcar. Each railcar includes an arrangement that allows an auxiliary reservoir AR to be charged with air via a valve V, as well as a braking assembly or unit BU, such as a brake cylinder BC, which is in communication with the valve V. The brake cylinder BC is operable to urge a brake shoe mechanism BS against a surface of the wheel W.

In operation, the brake pipe BP is continually charged to maintain a specific pressure, e.g., 90 psi, and each auxiliary reservoir AR and emergency reservoir ER (which may be combined into a single volume, or main reservoir) are similarly charged from the brake pipe BP. In order to brake the train TR, the operator actuates the control valve CV and removes air from the brake pipe BP, thereby reducing pressure to a lower level, e.g., 80 psi. The valve arrangement V quits charging the auxiliary reservoir AR and transfers air from the auxiliary reservoir AR to the brake cylinder BC. Normally using piston-operable arrangement, the brake cylinder BC urges the brake shoe mechanism BS against the wheel W. As discussed, in conventional, non-ECP air brake systems, the operator may adjust the level of braking using the control valve CV, since the amount of pressure removed from the brake pipe BP results in a specific pressure in the brake cylinder BC, which results in a specific application force of the brake shoe mechanism BS against the wheel W. Alternatively, in the ECP air brake arrangements, the brake commands are electronic over the ECP trainline TL to each railcar. Using the above-described air brake arrangement BA, the train can be slowed and/or stopped during operation and as it traverses the track.

In order to provide further control to the air brake arrangement BA, ECP brake arrangements can be used, such as in connection with certain railway vehicles and trains (e.g., freight trains and the like). As discussed, control signals can be transmitted from the on-board controller OBC, typically located in the cabin of the locomotive, to one or more of the railcars over the trainline TL. Each railcar is normally equipped with a local controller LC, which is used to monitor and/or control certain operating parameters in the air brake arrangement BA, such as the air reservoirs and/or the valve arrangement V. In this manner, the operator can broadcast brake commands to the railcars to ensure a smooth, efficient, and effective braking operation. This local controller LC typically includes the appropriate processor and components to monitor and/or control various components of the air brake arrangement BA.

With further reference to ECP-based air brake arrangements BA, such control facilitates effective train operation by permitting all railcars of the train TR to apply and release brakes at the same time, instead of being limited by the propagation delay of the above-discussed basic pneumatic control. Instead, using the ECP system, the operator may simply issue or set a "Train Brake Command" (TBC), which is transmitted to all of the railcars simultaneously. Still further, such an ECP system improves safety by alerting the operator about any error conditions, e.g., if a car detects that it is unable to apply brakes, if a car detects that the brakes are or have been over applied, and the like. In addition, the ECP system is typically configured to monitor brake pipe pressure, reservoir pressure, and upstream brake cylinder pressure at the railcar level.

Figures 2A, 2B:
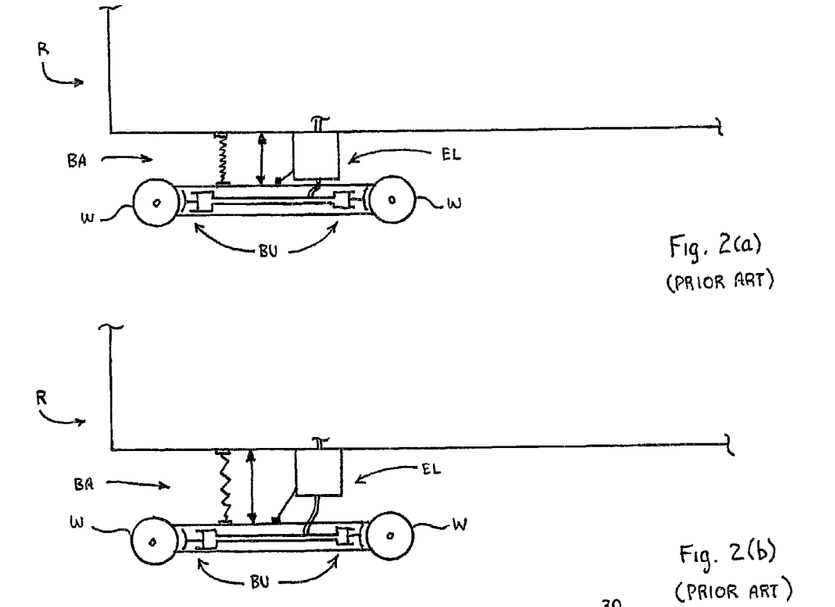
FIG. 2(a) is a schematic view of an air brake arrangement for a train according to the prior art where a railcar is in a loaded state.
FIG. 2(b) is a schematic view of the air brake arrangement of FIG. 2(a) where the railcar is in a unloaded state.

As is known, the weight of a freight car can vary drastically, such that a loaded hopper car (FIG. 2(a)) may weigh 3-4 times the weight of an empty car (FIG. 2(b)). Accordingly, the amount of pressure in the brake cylinder BC needed to stop a loaded railcar is much higher than the pressure needed to stop an empty car. Accordingly, if the amount of pressure needed to stop a loaded car was applied to an empty car, the wheels W would skid, causing wheel W and track damage. Similarly, if the amount of pressure needed to stop an empty car was applied to a loaded or partially loaded car, the braking performance would be reduced, potentially to the point where the railcar may not stop at all (e.g., braking the car on a grade). In order to address this issue, and with continued reference to FIG. 1, conventional freight cars are normally equipped with an empty-load device EL. Such an empty-load device EL are configured to regulate the brake cylinder BC pressure when a car is empty. When a car is loaded, the empty-load device EL allows for full pressure (or full application) in and by the brake cylinder BC.

As is known, the empty-load device typically uses the height of the railcar body as the mechanical input to the regulator switch between "empty" and "loaded" settings. For example, the sensor arrangement may be in the form of a lever or arm that rotates or moves based upon the height of the car body with respect to the truck. In addition, it is noted that empty-load devices EL are available with different regulation amounts. For example, some empty-load devices EL may regulate the "downstream" pressure to 50% of the "upstream" pressure when an empty car is detected, while others may regulate the "downstream" pressure to some other percentage of "upstream" pressure, e.g., 60%, 40%, and the like.

There exists a need in the industry to ensure that the appropriate regulated pressure is being delivered by the brake cylinder (or other air-operable braking assembly). Further, there exists a need in the industry to detect the proper operation, failure, and/or need for maintenance of the empty-load device. There is also a need in the industry for the enhancement of the effective operation of existing and newly-installed empty-load devices on railcars and other vehicles having air-operable braking assemblies and air brake arrangements.

SUMMARY OF THE INVENTION

Generally, provided is an empty-load device feedback arrangement and an air brake arrangement that address and/or overcome some or all of the drawbacks and deficiencies that exist in braking systems. Preferably, provided is an empty-load device feedback arrangement and an air brake arrangement that are useful in connection with an air brake arrangement of a train and/or railway vehicle. Preferably, provided is an empty-load device feedback arrangement and an air brake arrangement that are useful in connection with an electronically-controlled pneumatic (ECP) braking system of a train. Preferably, provided is an empty-load device feedback arrangement and an air brake arrangement that ensure the proper operation and activation of an empty-load device for a railcar. Preferably, provided is an empty-load device feedback arrangement and an air brake arrangement that minimizes or prevents the incorrect application of pressure in an air-operable braking assembly.

Therefore, in one preferred and non-limiting embodiment, provided is empty-load device feedback arrangement for a train with at least one railcar having an air brake arrangement with at least one air-operable braking assembly. The arrangement includes: (a) at least one empty-load device having: (i) at least one sensor arrangement configured to sense a load associated with at least one railcar; (ii) at least one braking assembly input exhibiting a delivered air pressure; (iii) a regulation arrangement configured to regulate air pressure; and (iv) at least one braking assembly output exhibiting a regulated air pressure. Further included is at least one pressure sensor configured to: (i) sense the regulated air pressure of the air being delivered to the at least one air-operable braking assembly; and (ii) generate a regulated air pressure signal.

In another preferred and non-limiting embodiment, and in an air brake arrangement including: at least one air-operable braking assembly for braking at least one wheel of a railcar; at least one empty-load device having: (i) at least one sensor arrangement configured to sense a load associated with at least one railcar; (ii) at least one braking assembly input exhibiting a delivered air pressure; (iii) a regulation arrangement configured to regulate air pressure; and (iv) at least one braking assembly output exhibiting a regulated air pressure; and at least one local controller configured to control at least one component of the air brake arrangement, provided is an empty-load device feedback arrangement. This empty-load device feedback arrangement includes at least one pressure sensor configured to: (i) sense the regulated air pressure of the air being delivered to the at least one air-operable braking assembly; and (ii) generate a regulated air pressure signal. Further, the at least one local controller is further configured to: (i) receive the regulated air pressure signal from the at least one pressure sensor; and (ii) generate downstream air pressure data based at least partially on at least one of the following: the regulated air pressure signal, a delivered air pressure signal, an upstream air pressure signal, existing air pressure data, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention.

According to one preferred and non-limiting embodiment of the present invention, provided is an empty-load device feedback arrangement 10 for an air brake arrangement BA used in connection with a railcar R, which is part of a consist making up a train TR. Certain preferred and non-limiting embodiments of the empty-load device feedback arrangement 10 according to the present invention are illustrated in schematic form in FIGS. 3-7.

As set forth above and hereinafter, the empty-load device feedback arrangement 10 of the present invention is specifically discussed herein in connection with a pneumatically-driven brake arrangement (air brakes) for a train TR or railway vehicle, such as the air brake arrangement BA illustrated in FIGS. 1, 2(a), and 2(b). However, the empty-load device feedback arrangement 10 is equally useful with and applicable to a variety of configurations of braking arrangements and applications involving vehicles with air-based braking systems that require or include an empty-load device EL. Therefore, the arrangement 10 may also be used in connection with roadway vehicles, such as trucks, buses, and the like. As is known, many such vehicles, such as large trucks for hauling cargo over distances, include similar braking arrangements that use pneumatic-driven braking systems for slowing or stopping the vehicle. Accordingly, while the empty-load device feedback arrangement 10 of the present invention is predominantly discussed in connection with railway vehicles, all similar applications and arrangements are envisioned and may be used in connection with the arrangement 10 of the present invention.

Similarly, the empty-load device feedback arrangement 10 of the present invention can be used in connection with a variety of types of braking arrangements of a railcar R or train TR, as well as the braking arrangement of the locomotive or engine. As also discussed hereinafter, while the empty-load device feedback arrangement 10 of the present invention is preferably used in connection with existing electronically-controlled pneumatic (ECP) air brake systems, it is also useful in connection with dynamic braking systems, blended or combination braking systems, emergency braking systems, and the like.

Figure 3:
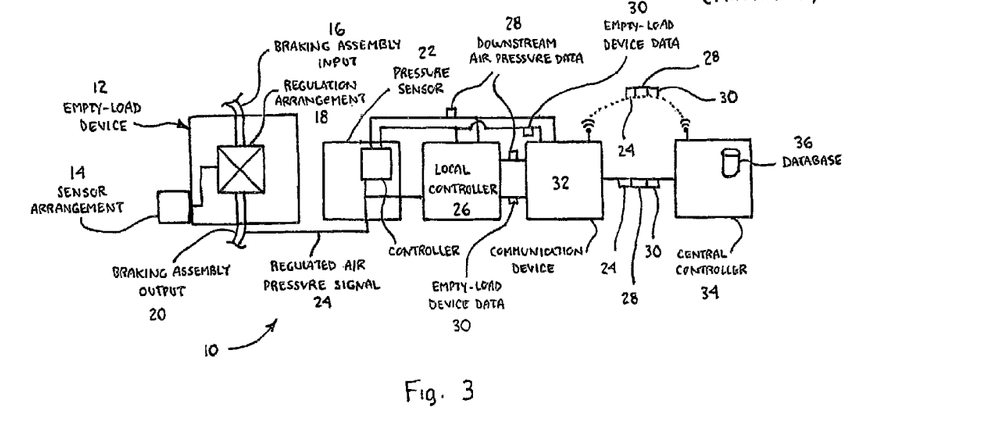
FIG. 3 is a schematic view of one embodiment of an empty-load device feedback arrangement for an air brake arrangement according to the principles of the present invention.

One preferred and non-limiting embodiment of an empty-load device feedback arrangement 10 according to the present invention is illustrated in FIG. 3. In this embodiment, the empty-load device feedback arrangement 10 includes at least one empty-load device 12. This empty-load device 12 includes at least one sensor arrangement 14 that is configured or adapted to sense a load associated with at least one railcar R, such as one truck of a railcar R. In addition, the empty-load device 12 includes at least one braking assembly input that exhibits a delivered air pressure. In particular, and as is known, the braking assembly input 16 exhibits the "upstream" air pressure, such as the air pressure in the brake pipe BP or other upstream components of the air brake arrangement BA. Further, the empty-load device 12 includes a regulation arrangement 18 that is configured or adapted to regulate air pressure flowing therethrough, in particular, the air delivered through the braking assembly input 16. Finally, the empty-load device 12 includes at least one braking assembly output 20, which exhibits a regulated air pressure (also referred to as the "downstream" air pressure from the empty-load device 12).

In operation, the empty-load device 12 accepts air (typically via the valve arrangement V), whether from the brake pipe BP, a hatch reservoir FIR, an auxiliary reservoir AR, an emergency reservoir EMR, or the like, and regulates the air pressure that is delivered to the braking assembly BU, such as the brake cylinder BC. As discussed above, and based upon whether a load is sensed in connection with a railcar R by the sensor arrangement 14, the empty-load device 12, and in particular the regulation arrangement 18, regulates the air pressure of the air delivered to the braking assembly BU based upon the sensed load. As discussed above, when the sensor arrangement 14 senses a load in the railcar R (such as a freight car or the like), the regulation arrangement 18 does not regulate the air pressure of the delivered air, thus allowing a full application of the brake shoe mechanism BS against the wheel W. However, and as also discussed above, if the sensor arrangement 14 senses that there is no load or an insufficient load, the regulation arrangement 18 regulates the air pressure of the delivered air to an appropriate level to adjust the force at which the brake shoe mechanism BS contacts and is applied to the wheel W. It is envisioned that the sensor arrangement 14 may be in the form of a lever or arm that mechanically senses the load (or lack thereof) in the railcar R. In addition, it is envisioned that the regulation arrangement 18 is adjustable and may be configured or adapted to regulate the air pressure to a variety of levels in order to provide a more effective application of the braking assembly U. Still further, the regulation arrangement 18 may be any suitable arrangement or configuration to effectively regulate air pressure of the air in the empty-load device 12. For example, the regulation arrangement 18 may include regulators, valves, pop-off valves, or any other suitable mechanical or fluidic arrangements.

With continued reference to FIG. 3, and in this preferred and non-limiting embodiment, the empty-load device feedback arrangement 10 includes at least one pressure sensor 22 and is configured or adapted to sense the regulated air pressure, i.e., the air pressure at and/or downstream from the braking assembly output 20. In this manner, the pressure sensor 22 is sensing the air pressure that is being delivered to the air-operable braking assembly BU.

As discussed in more detail hereinafter, the use of this pressure sensor 22 in connection with the empty-load device 12 allows for the sensing or determination of the regulated air pressure, i.e., the downstream pressure from the empty-load device 12. This regulated air pressure signal 24 (and determination made based thereon) will lead to a number of functional and safety improvements in the operation of the air brake arrangement BA of the train TR. These functional and safety improvements will be discussed in more detail hereinafter.

With continued reference to FIG. 3, this preferred and non-limiting embodiment of the empty-load device feedback arrangement 10 includes at least one local controller 26. This local controller 26 is configured, adapted, or programmed to receive the regulated air pressure signal 24 from the pressure sensor 22. In addition, the local controller 26 is configured, adapted, or programmed to generate downstream air pressure data 28 (based at least partially on the regulated air pressure signal 24), a delivered air pressure signal or data (such as a downstream air pressure signal or other indication of the air pressure that is being delivered to the braking assembly BU (e.g., the brake cylinder BC)), an upstream air pressure signal or data (such as the air pressure being delivered to the braking assembly input 16 or in some other upstream portion of the air brake arrangement BA), and/or existing air pressure data (such as data already being sensed in other components or portions of the air brake arrangement BA).

In this embodiment, the local controller 26 is further configured, adapted, or programmed to determine and/or generate empty-load device data 30 based at least partially on the downstream air pressure data 28, the regulated air pressure signal 24, the delivered air pressure signal, the upstream air pressure signal, and/or the existing air pressure data. This empty-load device data 30 may include a variety of information and data points that can be beneficially used to monitor and/or control the operation of the air brake arrangement BA, the braking assembly BU, the empty-load device 12, or any of the components and portions of the air brake arrangement BA. In this embodiment, the empty-load device data 30 includes, but is not limited to, empty-load device operation data, empty-load device verification data, empty-load device maintenance data, empty-load device state data, air brake arrangement data, and/or air pressure data. As discussed, this information, either in and of itself or as part of a further determination, can be used to functionally monitor and describe the operation and state of the various components within the air brake arrangement BA, such as the empty-load device 12.

As further illustrated in FIG. 3, and in this preferred and non-limiting embodiment, the empty-load device feedback arrangement 10 includes at least one communication device 32. This communication device 32 is configured, adapted, or programmed to directly or indirectly transmit or communicate at least a portion of the empty-load device data 30 to a remote controller, a central controller, a vehicle controller, an on-board controller of a locomotive, and/or a central dispatch system. For simplicity, these various controllers are considered remote from the local controller 26, and are referred to hereinafter collectively as a central controller 34. For example, this central controller 34 may be in the form of the on-board controller OBC of the locomotive, and the communication between the communication device 32 and this central controller 34 (OBC) may be through the train line TL. Of course, some or all of the empty-load device data 30 can be transmitted to the central controller 34, in this embodiment the on-board controller OBC, in a wireless manner, over the rails of the track, or in any other suitable communication technique and methodology.

In another variation of this preferred and non-limiting embodiment, the central controller 34 is a remote central dispatch system or controller with which the local controller 26 (and preferably the on-board controller OBC) wirelessly communicates. For example, in one preferred and non-limiting embodiment, the on-board controller OBC gathers some or all of the empty-load device data 30 from the individual railcars R of the train TR, and transmits this information to the central dispatch system (whether dynamically or statically at various points). A number of data communication platforms and methodologies can be used in order to appropriately distribute and effectively utilize the empty-load device data 30 for making functional and/or safety operating decisions.

As discussed, any communication means and format can be used or integrated with the empty-load device feedback arrangement 10 of the present invention. As discussed, the transmission of data, such as the empty-load device data 30, may be over a wire, a cable, an existing communication line, a communication link, and the like. Preferably, the empty-load device data 30 is provided by or transmitted by the communication device 32 over the existing communication systems of the train TR.

It is further envisioned that the local controller 26 is attached to, in communication with, integrated with, and/or associated with the pressure sensor 22. Accordingly, the pressure sensor 22 may be in the form of a smart sensor with its own computer (i.e. local controller 26) control or programs to make the various determinations discussed above, including the determination of the empty-load device data 30. However, the local controller 26 may be a separate programmed component that receives the information and data, such as the regulated air pressure signal 24, from the pressure sensor 22, and uses this information data to make the discussed determinations. Any suitable arrangement for data processing can be used in order to receive, determine, and/or transmit or communicate the empty-load device data 30.

As discussed, the local controller 26 may take a variety of forms, including a separate computer or computerized system or component, or a computerized system or component that is integrated with existing hardware and/or software. Also, this local controller 26 preferably includes the appropriate hardware, software, firmware, and the like in order to receive, process, and/or transmit or communicate data, such as some or all of the empty-load device data 30 (as well as the data determined by or associated with the regulated air pressure signal 24, the downstream air pressure data 28, and the like). Still further, it is envisioned that any of this data may be stored locally in the database, which may be resident or present at the local controller 26. However, it is preferable that this information and data be populated in a database, such as database 36, at the central controller 34, such as the on-board controller OBC. In this manner, information and data, including, but not limited to, the regulated air pressure signal 24, the downstream air pressure data 28, the empty-load device data 30, and the like, may be included with or populated on an existing database, such as the train or track database in the on-board controller OBC of the locomotive. Still further, any of this information and data can be further transmitted to and populated on a database that is present at or in communication with the central databases at the central dispatch system.

In a further preferred and non-limiting embodiment, the pressure sensors 22 of each individual empty-load device feedback arrangement 10 (which may include one empty-load device 12 per car, one empty-load device 12 per truck, etc.), the local controllers 26, and/or the communication devices 32, maybe partially or wholly combined or integrated into a unified system. In this manner, it is envisioned that the combined system is capable of determining downstream air pressure data 28 and/or empty-load device data 30 that can be used in connection with making functional and operational decisions with respect to an individual air brake arrangement BA or braking assembly BU of a railcar R. Again, any of this information and data may be further processed, transmitted by, or communicated to one or more other remote controllers, such as the on-board controller OBC, the central dispatch system, and the like.

As discussed above, the empty-load device feedback arrangement 10 of the present invention is particularly useful in connection with railway vehicles and trains TR that include or are equipped with an electronically-controlled pneumatic air brake arrangement. Accordingly, in another preferred and non-limiting embodiment, the local controller 26 is integrated with or in the form of an existing controller 38 of the existing ECP system 40 or arrangement. Such an arrangement is illustrated in FIGS. 4-7. Therefore, the local controller 26 may be in communication with such an existing controller 38, incorporated with the existing controller 38, programmed as part of the existing controller 38, and/or integrated with the existing controller 38.

Accordingly, and in this preferred and non-limiting embodiment, the presence of this existing controller 38 located on or within the air brake arrangement BA for each railcar R allows this existing controller 38 to be beneficially used in connection with the presently-invented empty-load device feedback arrangement 10. In particular, this existing controller 38 may be configured, adapted, or programmed to implement the above-described determinations together with the normal control and/or monitoring programs associated with an ECP system 40. Further, this existing controller 38 can be configured, adapted, or programmed to further interact with the pressure sensor 22 and determine downstream air pressure data 28 and/or empty-load device data 30. Of course, it is further envisioned that the existing controller 38 may be any remote controller or computer on or in communication with the train TR.

As is also known, such an existing ECP system 40 includes the appropriate communication devices and/or programming in order to communicate with the on-board controller OBC, such as through the train line TL. Accordingly, the communication device 32 of the empty-load device feedback arrangement 10 may be integrated with, in communication with, incorporated with, or programmed as part of the existing communication device or communication medium/architecture of the train TR. In addition, the determination and/or communication of the downstream air pressure data 28 and/or the empty-load device data 30 may occur on a dynamic basis, a periodic basis, continually, on a pre-determined basis, prior to departure, during operation, and/or during an emergency event. Therefore, this empty-load device data 30 may be utilized to make important operational and control decisions before, during, and/or after train operation and/or emergency events.

In another preferred and non-limiting embodiment, the empty-load device data 30 is provided by the local controller 26 to the on-board controller OBC of a locomotive of the train TR. The on-board controller OBC (which represents an existing unit used in connection with at least partially automatic trains TR) determines further data for use in making operational decisions regarding the air brake arrangement BA of the train TR on a railcar-by-railcar basis. As discussed above, this empty-load device data may include or may be used to determine a variety of data points for making appropriate monitoring and/or control decisions. For example, this empty-load device data may be in the form of or be used to determine the proper operation of the empty-load device 12. Similarly, the empty-load device data 30 can be used by or lead to further determinations for verifying various conditions of the empty-load device 12, such as by monitoring the upstream (e.g., braking assembly input 16) and/or downstream (e.g., downstream air pressure data 28) air pressure. Still further, and for maintenance purposes, the downstream air pressure data 28 and/or the empty-load device data 30 can be compared to the upstream pressure to verify that the empty-load device 12 is functional (or has failed in some regard). Still further, by monitoring the upstream and downstream pressures, each railcar R can make a determination of the state of the empty-load device 12, i.e., "empty" or "loaded", and report this state to the local controller 26, existing controller 38, on-board controller OCB, central dispatch system, and the like. Any mismatch could be quickly identified, and the railcar R either "cut out" (as appropriate) or repaired before any damage occurs. In addition, with this important downstream pressure feedback, such as in the form of downstream air pressure data 28 and/or empty-load device data 30, an ECP system 40 of the railcar R can be used to control and adjust the upstream pressure to achieve the desired downstream pressure. This provides additional functional and safety control operations for the railcar R and the train TR. Therefore, and in one preferred and non-limiting embodiment, and based at least partially on the downstream air pressure data 28 and/or the empty-load device 30, the central controller 34 may make additional determinations for implementation in connection with the air brake arrangement BA of any specific railcar R or groups of railcars R.

As is known, the on-board controller OBC of the locomotive controls or is in communication with a visual display device, which is used to present data and information to the operator of the train TR. In this manner, and in one preferred and non-limiting embodiment, a message or other visual indicia may be displayed to the operator on the visual display device, and the content of this message or visual indication may include some or all of the empty-load device data 30 and/or some other condition or operation of the air brake arrangement BA. As discussed, this additional information may be transmitted to a further remote system, such as the central dispatch system, and/or stored on the database 36 of the central controller 34. In summary, this empty-load device data 30 and/or other additional information and data determined therefrom, can be used to approve the operation of the air brake arrangement BA for each particular railcar R (or group of railcars R) and ensure proper operation of one or more of the components of the air brake arrangement BA, and preferably the empty-load device 12.

In order to provide additional information to the operator of a train TR, one or more alarms may be included that would communicate to the operator of the train TR that there is a failure state or condition, preferably in connection with the empty-load device 12. Therefore, such an alarm or other indication to the operator of the train TR would permit the operator to manually control the train TR to achieve a safe situation. Of course, and as is known, such as a connection with Positive Train Control (PTC) systems, the central controller 34 may be configured, adapted, or programmed to automatically implement or enforce such control through the on-board controller OBC. This alarm or indication may be in the form of an audio alarm, a visual alarm, a tactile alarm, and the like.

Figure 4:
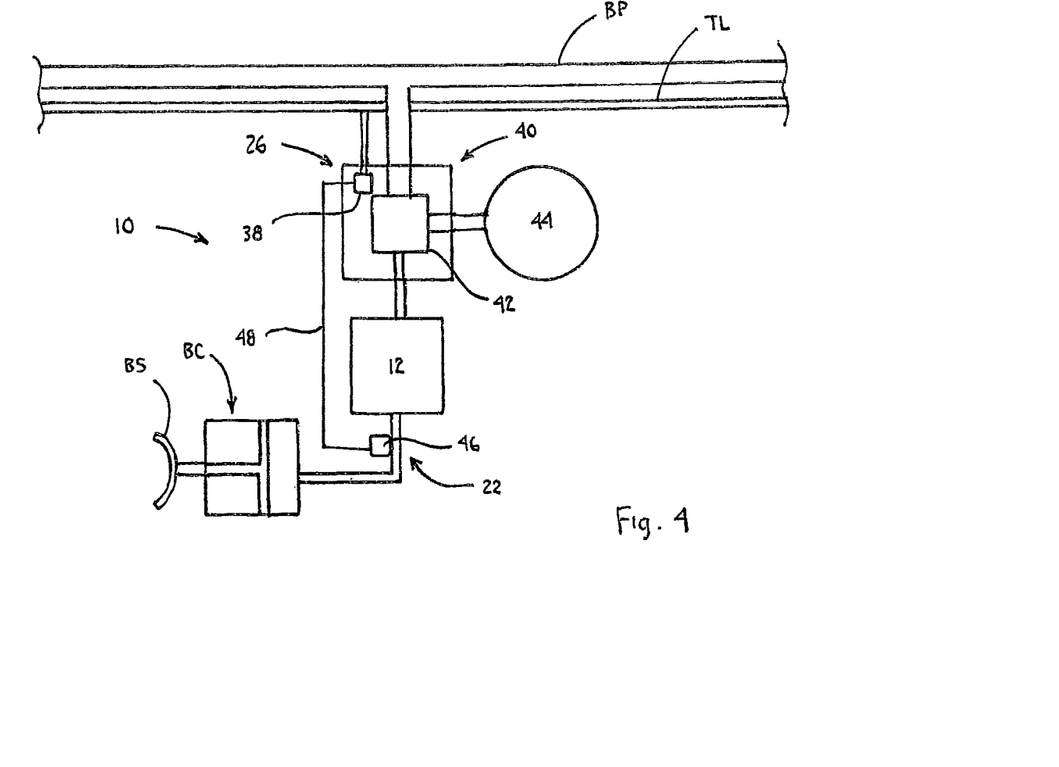
FIG. 4 is a schematic view of another embodiment of an empty-load device feedback arrangement for an air brake arrangement according to the principles of the present invention.

Another preferred and non-limiting embodiment of the empty-load device feedback arrangement 10 of the present invention is illustrated in FIG. 4. In this embodiment, the local controller 26 is in the form of the existing controller 38 associated with the ECP electronics and pneumatic system 40. Accordingly, this ECP system 40 includes a specifically-configured valve 42 that is connected between the brake pipe BP, an air reservoir 44, and the empty-load device 12. One or more of the components of the ECP system 40, including the valve 42, are controlled by or through the existing controller 38. In addition, the existing controller 38 is in communication with the on-board controller OBC through the train line TL, i.e., through a communication device associated with the existing controller 38.

With specific respect to the preferred and non-limiting embodiment of FIG. 4, the pressure sensor 22 is in the form of a pressure transducer 46. The pressure transducer 46 senses the air pressure at or near the braking assembly output 20 (i.e., downstream from the empty-load device 12), and provides the regulated air pressure signal 24 over a communication line 48 to the existing controller 38. Accordingly, in this embodiment, the existing controller 38 determines the downstream air pressure data 28 and/or the empty-load device data 30, and provides some or all of this data and information to the on-board controller OBC over the train line TL.

Figure 5:
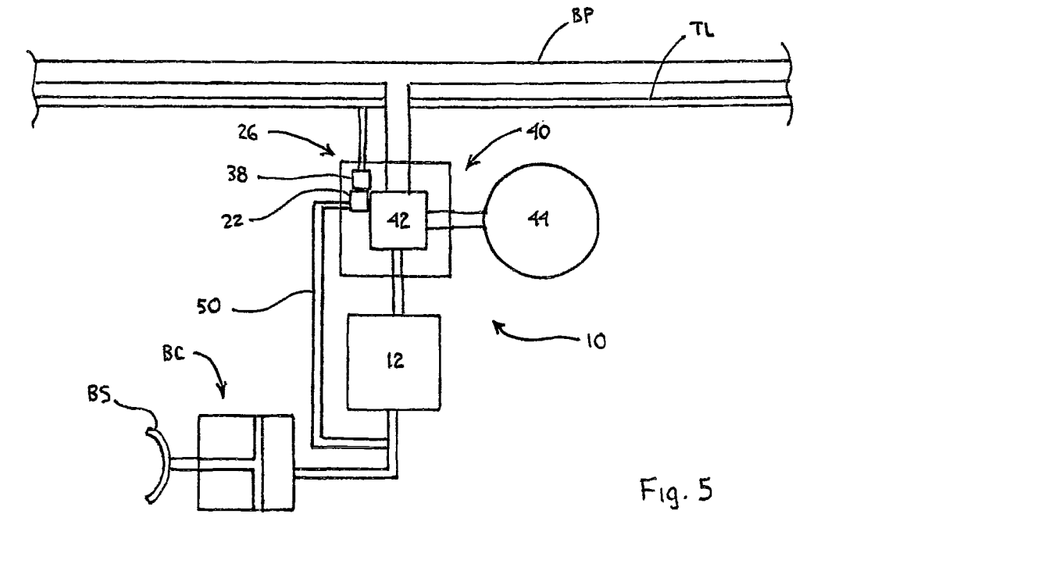
FIG. 5 is a schematic view of a further embodiment of an empty-load device feedback arrangement for an air brake arrangement according to the principles of the present invention.

A further preferred and non-limiting embodiment of the empty-load device feedback arrangement 10 of the present invention is illustrated in FIG. 5. As with the embodiment of FIG. 4, the arrangement 10 of FIG. 5 also utilizes the existing ECP system 40, including the existing controller 38. However, in this embodiment, the pressure sensor 22 is positioned with or integrated with the existing controller 38. In order to obtain or sense the air pressure downstream from the empty-load device 12, an air connection 50 is fluidly connected between the braking assembly output 20 and/or a downstream location from the empty-load device 12 and the pressure sensor 22; again, which may be adjacent to, incorporated with, and/or integrated with the existing controller 38.

For example, in one exemplary embodiment of the empty-load device feedback arrangement 10 of FIG. 5, one or more of the transducers on the manifold circuit board can be populated and/or tapped. In particular, the manifold may be provided with a tap connection to the pressure sensor 22. Further, the air connection 50 may be in the form of a hose connection to the downstream piping leading from the empty-load device 12. In addition, the software on the existing controller 38 can be modified or programmed to read this regulated air pressure signal 24 as the "downstream BC" measurement as part of its data structure. One of the benefits to this specific arrangement is that the existing circuit board would be amenable to such modifications, which would result in a reduction in engineering effort and recurring costs.

Figure 6:
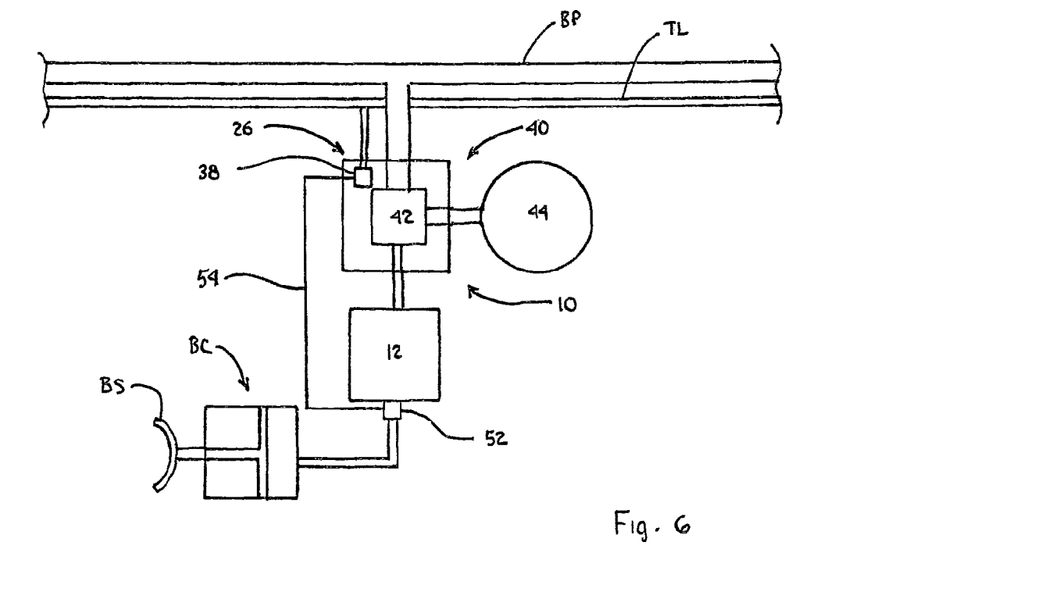
FIG. 6 is a schematic view of a still further embodiment of an empty-load device feedback arrangement for an air brake arrangement according to the principles of the present invention.

A still further preferred and non-limiting embodiment of the empty-load device feedback arrangement 10 according to the present invention is illustrated in FIG. 6, which, as discussed above, includes the existing ECP system 40. However, in this embodiment, the pressure sensor 22 is in the form of a sensor module 52 that is attached to the empty-load device 12. As discussed above in connection with the embodiment of FIG. 4, the sensor module 52 provides the regulated air pressure signal 24 (or similar data) to the existing controller 38 over a communication line 54. This sensor module 52 may include the appropriate electrical connector (for the communication line 54), attachment mechanisms (for attachment of the sensor module 52 to the empty-load device 12, e.g., recessed allen-head bolts or the like), tap holes or orifices for mounting and/or providing a mount for standard "downstream" brake cylinder BC fittings, and a brake cylinder BC "OUT" port through the middle of the sensor module 52. In particular, this arrangement may be configured to provide this pass-through "OUT" tap for connection to the railcar R piping system. In addition, the sensor module 52 may include the appropriate internal circuit board and mechanics to allow for the pressure to be read effectively and accurately. As discussed above, the software programs on the existing controller 38 can be modified in order to accept this input. Such an arrangement lends itself to "retrofit" applications, since it mounts to a standard empty-load device 12 bracket. In addition, such an arrangement will provide the appropriate electronics platform for future expansion, e.g., accelerometer for derailment, wheel flat sensing arrangements, hand brake sensing arrangements, hand brake actuator arrangements, and the like.

Figure 7:
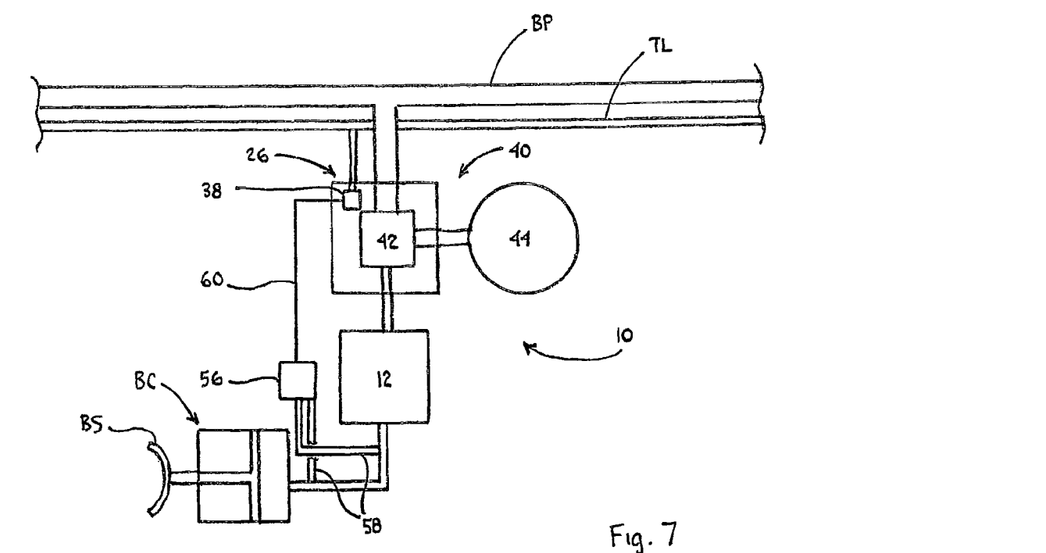
FIG. 7 is a schematic view of another embodiment of an empty-load device feedback arrangement for an air brake arrangement according to the principles of the present invention.

In a still further preferred and non-limiting embodiment of the empty-load device feedback arrangement 10 of the present invention, and as illustrated in FIG. 7, a sensor module 56 may again be provided (as discussed above in connection with the embodiment of FIG. 6). This sensor module 56 could be remotely mounted anywhere on or within the air brake arrangement BA and/or railcar R. As discussed above, this sensor module 56 would include an air connection 58 to the downstream portion or brake cylinder BC pipe and/or the braking assembly output 20 on the downstream side of the empty-load device 12. Also, a communication line 60 would provide for data transfer, e.g., the regulated air pressure signal 24 and/or corresponding data to the existing controller 38. As discussed above, the existing controller 38 would be configured, adapted, or programmed to accept this input and make the further determinations and calculations discussed above. One benefit of this arrangement is that it may be configured to support the monitoring of multiple downstream locations, such as by using multiple air connections 58 to various "downstream" portions of the piping system. This would allow for further monitoring and determinations regarding the functionality and operation of these downstream portions in the air brake arrangement BA. In addition, such an arrangement would allow for future expansion for additional monitoring capabilities.

In this manner, provided is an empty-load device feedback arrangement 10 that provides numerous benefits and advantages as compared to existing systems. For example, the empty-load device feedback arrangement 10 provides important feedback to the local controller 26 and/or existing controller 38 for further determinations of empty-load device data 30 and/or other data associated with performance of the air brake arrangement BA. Further, the empty-load device feedback arrangement 10 of the present invention provides feedback to determine or confirm that the empty-load device 12 is operating properly, which state the empty-load device 12 is in, and/or the condition of the empty-load device 12 (or other components in the air brake arrangement BA). In addition, the empty-load device data 30 provided by or determined through the empty-load device feedback arrangement 10 can be used to make further determinations regarding the performance of the railcar R, the train TR, the air brake arrangement BA, and/or other functional and operational conditions of the train TR.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An empty-load device feedback arrangement for a train with at least one railcar having an air brake arrangement with at least one air-operable braking assembly, the arrangement comprising:
(a) at least one empty-load device comprising:
(i) at least one sensor arrangement configured to sense a load associated with the at least one railcar;
(ii) at least one braking assembly input exhibiting a delivered air pressure;
(iii) a regulation arrangement configured to regulate air pressure; and
(iv) at least one braking assembly output exhibiting a regulated air pressure; and
(b) at least one pressure sensor in communication with the regulated air pressure from the at least one braking assembly output, the at least one pressure sensor configured to:
(i) sense the regulated air pressure of the air being delivered to the at least one air-operable braking assembly; and
(ii) generate a regulated air pressure signal.

2. The empty-load device feedback arrangement of claim 1, further comprising at least one local controller configured to:
receive the regulated air pressure signal from the at least one pressure sensor; and
generate downstream air pressure data based at least partially on at least one of the following: the regulated air pressure signal, a delivered air pressure signal, an upstream air pressure signal, existing air pressure data, or any combination thereof.

3. The empty-load device feedback arrangement of claim 2, wherein the at least one local controller is further configured to generate empty-load device data based at least partially on at least one of the following: downstream air pressure data, the regulated air pressure signal, the delivered air pressure signal, the upstream air pressure signal, existing air pressure data, or any combination thereof.

4. The empty-load device feedback arrangement of claim 3, wherein the empty-load device data comprises at least one of the following: empty-load device operation data, empty-load device verification data, empty-load device maintenance data, empty-load device state data, air brake arrangement data, air pressure data, or any combination thereof.

5. The empty-load device feedback arrangement of claim 3, further comprising at least one communication device configured to directly or indirectly transmit or communicate at least a portion of the empty-load device data to at least one of the following: a remote controller, a central controller, a vehicle controller, an on-board controller of a locomotive, a central dispatch system, or any combination thereof.

6. The empty-load device feedback arrangement of claim 5, wherein the at least one communication device transmits at least a portion of the empty-load device data over at least one of the following: a wire, a cable, a communication line, an existing communication line, or any combination thereof.

7. The empty-load device feedback arrangement of claim 5, wherein the at least one communication device transmits at least a portion of the empty-load device data wirelessly.

8. The empty-load device feedback arrangement of claim 2, wherein the at least one local controller is attached to, in communication with, integrated with and/or associated with the at least one pressure sensor.

9. The empty-load device feedback arrangement of claim 2, wherein the air brake arrangement comprises an existing controller, and wherein the at least one local controller is at least one of the following: in communication with existing controller, incorporated with the existing controller, programmed as part of the existing controller, integrated with the existing controller, or any combination thereof.

10. The empty-load device feedback arrangement of claim 1, wherein the at least one pressure sensor comprises at least one pressure transducer, and the regulated air pressure signal is transmitted to at least one controller.

11. The empty-load device feedback arrangement of claim 1, wherein the at least one pressure sensor is part of at least one sensor module, and the regulated air pressure signal is transmitted to at least one controller.

12. The empty-load device feedback arrangement of claim 11, wherein the at least one sensor module is at least one of attached to, in communication with, integrated with and/or associated with the empty-load device.

13. The empty-load device feedback arrangement of claim 1, further comprising at least one controller configured to generate empty-load device data based at least partially on at least one of the following: downstream air pressure data, the regulated air pressure signal, the delivered air pressure signal, the upstream air pressure signal, existing air pressure data, or any combination thereof.

14. The empty-load device feedback arrangement of claim 13, wherein at least a portion of the empty-load device data is generated on at least one of the following bases: dynamically, periodically, continually, predetermined, prior to departure, during operation, during an emergency event, or any combination thereof.

15. The empty-load device feedback arrangement of claim 13, wherein the empty-load device data comprises at least one of the following: empty-load device operation data, empty-load device verification data, empty-load device maintenance data, empty-load device state data, air brake arrangement data, air pressure data, or any combination thereof, and wherein the at least one controller is configured to confirm the at least one empty-load device is operating properly based on the empty-load device data.

16. The empty-load device feedback arrangement of claim 13, wherein the at least one controller is further configured to determine at least one air brake arrangement condition based at least partially on the empty-load device data.

17. In an air brake arrangement comprising: at least one air-operable braking assembly for braking at least one wheel of a railcar; at least one empty-load device comprising:
  (i) at least one sensor arrangement configured to sense a load associated with at least one railcar;
  (ii) at least one braking assembly input exhibiting a delivered air pressure;
  (iii) a regulation arrangement configured to regulate air pressure; and
  (iv) at least one braking assembly output exhibiting a regulated air pressure;
and at least one local controller configured to control at least one component of the air brake arrangement, an empty-load device feedback arrangement comprising:
at least one pressure sensor in communication with the regulated air pressure from the at least one braking assembly output, the at least one pressure sensor configured to:
  (i) sense the regulated air pressure of the air being delivered to the at least one air-operable braking assembly; and
  (ii) generate a regulated air pressure signal;
wherein the at least one local controller is further configured to:
  (i) receive the regulated air pressure signal from the at least one pressure sensor; and
  (ii) generate downstream air pressure data based at least partially on at least one of the following: the regulated air pressure signal, a delivered air pressure signal, an upstream air pressure signal, existing air pressure data, or any combination thereof.

18. The empty-load device feedback arrangement of claim 17, wherein the at least one local controller is further configured to generate empty-load device data based at least partially on at least one of the following: downstream air pressure data, the regulated air pressure signal, the delivered air pressure signal, the upstream air pressure signal, existing air pressure data, or any combination thereof.

19. The empty-load device feedback arrangement of claim 18, wherein the empty-load device data comprises at least one of the following: empty-load device operation data, empty-load device verification data, empty-load device maintenance data, empty-load device state data, air brake arrangement data, air pressure data, or any combination thereof.

20. An air brake arrangement comprising:
at least one air-operable braking assembly for braking at least one wheel of a railcar;
at least one empty-load device comprising:
  (i) at least one sensor arrangement configured to sense a load associated with at least one railcar;
  (ii) at least one braking assembly input exhibiting a delivered air pressure;
  (iii) a regulation arrangement configured to regulate air pressure; and
  (iv) at least one braking assembly output exhibiting a regulated air pressure;

at least one pressure sensor in communication with the regulated air pressure from the at least one braking assembly output, the at least one pressure sensor configured to:
(i) sense the regulated air pressure of the air being delivered to the at least one air-operable braking assembly; and
(ii) generate a regulated air pressure signal;
at least one local controller configured to:
(i) control at least one component of the air brake arrangement;
(ii) receive the regulated air pressure signal from the at least one pressure sensor; and
(iii) generate downstream air pressure data based at least partially on at least one of the following: the regulated air pressure signal, a delivered air pressure signal, an upstream air pressure signal, existing air pressure data, or any combination thereof.

* * * * *